United States Patent [19]

Versluis

[11] 4,231,395
[45] Nov. 4, 1980

[54] NON-RETURN VALVE

[75] Inventor: Ronald Versluis, Alphen a/d Rijn, Netherlands

[73] Assignee: B.V. Neratoom, The Hague, Netherlands

[21] Appl. No.: 937,987

[22] Filed: Aug. 30, 1978

[30] Foreign Application Priority Data

Sep. 6, 1977 [NL] Netherlands .................... 7709799

[51] Int. Cl.³ ........................................... F16K 15/02
[52] U.S. Cl. ................................................. 137/514.7
[58] Field of Search .................. 137/514, 514.3, 514.5, 137/514.7

[56] References Cited

U.S. PATENT DOCUMENTS

| 816,216 | 3/1906 | Cash | 137/514.7 |
| 1,322,938 | 11/1919 | Parker | 137/514.7 |
| 1,466,171 | 8/1923 | Jacobsen | 137/514.5 |
| 1,710,214 | 4/1929 | Hassold | 137/514.5 X |
| 2,602,631 | 7/1952 | Eickmeyer | 137/536 X |
| 2,917,077 | 12/1959 | Ziege | 137/514.7 |
| 3,141,471 | 7/1964 | Williamson | 137/514.7 X |

FOREIGN PATENT DOCUMENTS

| 814692 | 10/1951 | Fed. Rep. of Germany | 137/514 |
| 328835 | 5/1930 | United Kingdom | 137/514.7 |

Primary Examiner—Robert G. Nilson
Attorney, Agent, or Firm—Kenyon & Kenyon

[57] ABSTRACT

A non-return valve which upon reversal of the flow direction is rapidly closed without impingement of the valve member on the seat with a bang comprises a stationary valve guide bush wherein the valve member is adapted for axial displacement and whereby between the valve guide bush and the valve member there is provided a slotted space such that the closing movement of the valve member is damped just before it impinges on the seat.

7 Claims, 3 Drawing Figures

U.S. Patent  Nov. 4, 1980  4,231,395
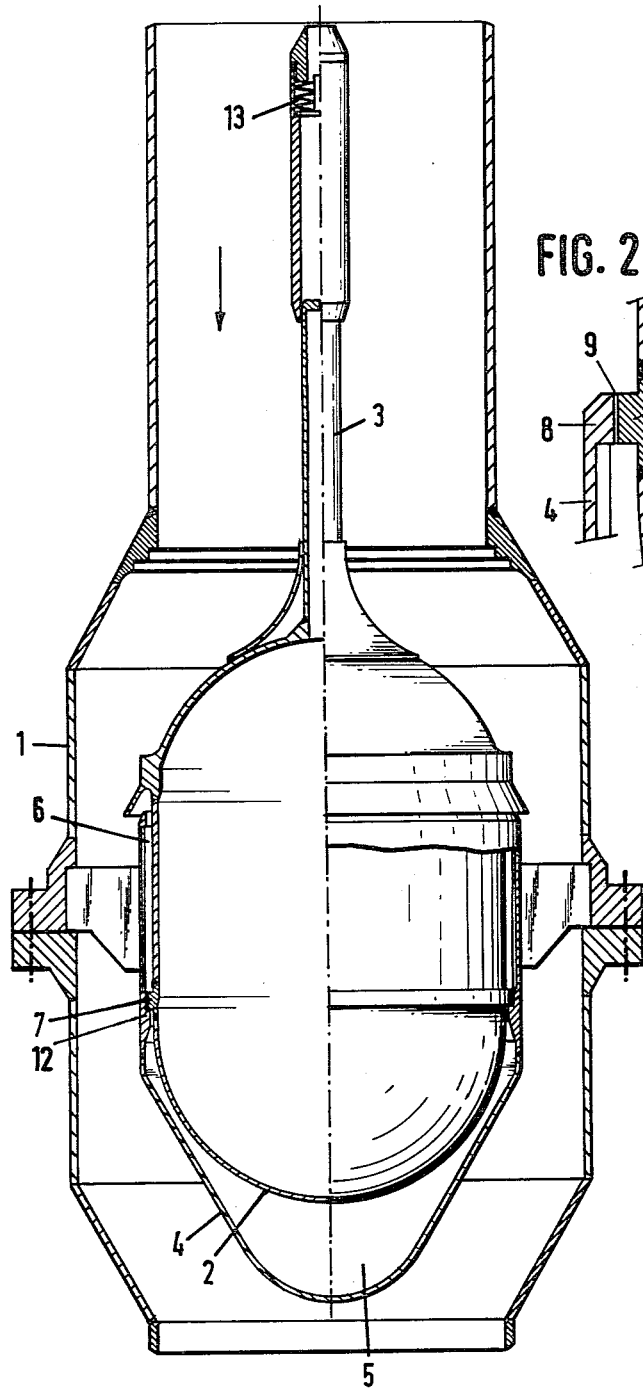
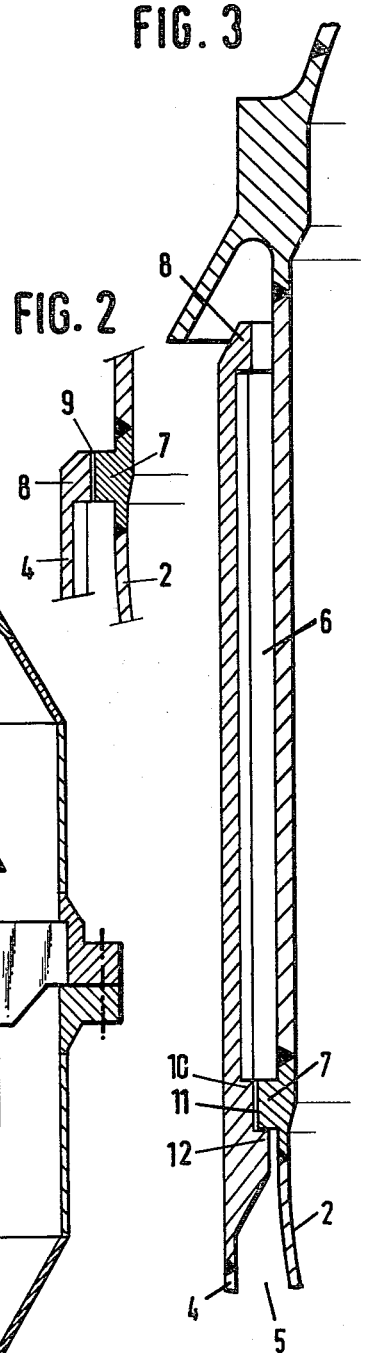

NON-RETURN VALVE

The present invention relates to a non-return valve comprising a body accommodating a float-shaped valve member connected to a valve rod.

Such an apparatus is disclosed in Dutch patent No. 19222, wherein a non-return valve is described comprising a hollow, float-shaped valve member connected to a valve rod. The weight of the valve member is so chosen that for normal flow of a medium through the system accommodating the non-return valve, the valve member leaves the closing aperture disposed at the bottom of the valve clear, but in case of reverse flow it off the closing aperture.

A substantial disadvantage of this apparatus is that upon the reversal of the flow direction, the valve member impinges with a substantial impact on the seat. This known effect has a detrimental effect on the lifetime of the non-return valve and constitutes one of the reasons why such a non-return valve cannot be employed in systems to which stringent safety regulations apply.

U.S. Pat. No. 2,602,631 discloses a non-return valve comprising a body accommodating a piston-shaped valve member which in the closed position of the valve impinges on a valve seat. The valve member is adapted for axial movement in a cylindrical valve guide bush having a conical rear end. Within the valve member there extends in the axial direction a spindle that at one end is fixedly connected to the valve member and at the other end projects through an aperture in the conical point of the valve guide bush. About the spindle there is disposed a helical spring urging the valve member against the valve seat in case the pressure supplied by a pump fails. The space between the valve guide bush and the valve member is in communication with the atmosphere.

However, this prior art valve also has the drawback that upon closure of the valve the movement of the valve member is not damped prior to impinging on the seat.

German Pat. No. 814,692 discloses a non-return valve for liquids, the closing movement of which can be damped prior to impingement of a valve member on the seat by a brake cylinder filled with braking oil disposed concentrically about the non-return valve.

British Pat. No. 328,835 discloses a non-return valve, the closure movement of which is damped by means of a piston construction. One end of the valve member has the shape of a hollow cone, the point of which is oriented towards the supply opening of the casing of the non-return valve. The other end of the valve member has the shape of a cylinder, the internal diameter of which is larger than the external diameter of a stationary cylinder disposed within the casing, accommodating a piston connected to the valve member via a spindle.

It is the object of the present invention to provide a non-return valve which closes without significant impact yet which substantially prevents a backflow.

This object is realized by the non-return valve according to the invention, which has a casing that accommodates a valve guide bush wherein a hollow valve member can axially slide and wherein a constricted space is formed between the inner wall of the valve guide bush and the outer wall of the valve member, in a limited axial range adjacent to the closed position.

According to a preferred embodiment of the non-return valve according to the present invention, there is provided a slotted space between the inner wall of the valve guide bush and the outer wall of the valve member likewise in a limited axial range adjacent to the open position.

The constricted space in the range of the closed or open position preferably comprises a narrowing of the diametral clearance between the valve member and the valve guide bush by an external shoulder ring connected to the valve member and at least one internal shoulder ring connected to the valve guide bush. The external shoulder ring connected to the valve member may also serve for restricting the axial displacement of the valve member within the valve guide bush. Preferably this is effected in that the external shoulder ring in the the open position abuts against a flange connected to the valve guide bush. By the construction of the present non-return valve both the opening and the closing of the non-return valve are damped when approaching the open and closed.

In connection with the operation of the non-return valve it is desirable that the normally downstream end of the valve guide bush be closed and that between the closed end of the valve guide bush and the valve member, even in the completely opened position of the valve, i.e. the position wherein the valve member extends the farthest admissible distance into the valve guide bush, there is disposed a chamber so that the closing of the non-return valve is not impeded by adhesion forces occurring between the valve member and the valve guide bush. When opening the non-return valve, a quantity of medium, mostly fluid, has to be discharged from said chamber via the diametral clearance between the valve member and the valve guide bush. When closing the non-return valve a quantity of medium should be supplied through said diametral clearance into the chamber.

The non-return valve according to the invention may be employed in many types of fluid handling systems, but it is designed in particular for the cooling system of sodium-cooled nuclear reactors, which have very stringent requirements with respect to the safety. The present non-return valve, however, may be adapted to the requirements of another fluid system by suitably selecting for instance the dimensions of the valve, the weight of the valve member, the minimal size of the chamber disposed between the closed end of the valve guide bush and the valve member, and the dimensions of the constricted spaces.

One preferred embodiment of the present non-return valve according to the invention will now be explained, by way of example, with reference to the accompanying drawing, wherein FIG. 1 shows this embodiment of the non-return valve in the fully open position, partly in cross-section, partly in view, FIG. 2 shows a part of the valve member and the valve guide bush in the range of the closed position, in cross-section and FIG. 3 shows a part of the valve member and the valve guide bush in the fully open position, in cross-section.

In FIG. 1 the left-hand portion is shown in cross-section while the right-hand portion is partly shown in view. In a valve body 1 there is accommodated a hollow valve member 2 connected to an axial stem 3. The normal flow direction is indicated in FIG. 1 by an arrow. The valve is drawn in the completely opened position. In the completely opened valve position, the valve member extends the greatest admissible distance into a fixed, closed end valve guide bush 4. In this position there is disposed a chamber 5 between the closed end of the valve guide bush and the valve member, which chamber communicates via the diametral clearance 6 between the valve member and the valve guide bush with the space between the valve body and the valve guide bush. The position of the valve member in the completely opened position of the valve is defined by an external shoulder ring 7 connected to the valve member and a flange 12 connected to the valve guide bush.

A spring 13, in a stem guide tube 14 which is supported coaxially in the valve body by conventional means (not shown), prevents the valve from being entirely closed if no backflow occurs. As a result a natural circulation of the medium in the direction of the arrow is ensured.

In the range of the closed position (FIG. 2) there is provided a constricted space 9 between the external shoulder ring 7 connected to the valve member 2 and an internal shoulder ring 8 at the open end of the valve guide bush 4. Said constricted space 9, damping the movement of the valve member 2 during closure, prevents the valve member 2 from impinging on the valve seat with an impact. During displacement of the valve member 2 from the opened position to the closed position, said constricted space is not formed until the external shoulder ring 7 arrives in the range of the closed position adjacent the internal shoulder ring 8 connected to the valve guide bush 4. Therefore the present non-return valve enables a rapid closure, so that a strong damping action occurs when the closed position is approached, thereby preventing damage to the valve. By this feature the present non-return valve distinguishes favourably from the non-return valves wherein damping may occur due to apertures disposed in the valve guide bush. Such non-return valves have either an inferior damping or a low closed speed.

In the entirely opened position (FIG. 3) the external shoulder ring 7 connected to the valve member abuts against the flange 12 connected to the valve guide bush 4. To the valve guide bush 4 there is furthermore connected an internal shoulder ring 10 which in the axial range adjacent to the open position defines a constricted space 11 together with the external shoulder ring 7. Due to said constricted space 11 the movement of the valve member from the closed position to the open position is damped when the latter is approached, so that the external ring 7 does not impinge against the flange 12 abruptly. However, it should be noted that said constricted space 11 decelerates the movement of the valve member 2 from the open position to the closed position. By tuning the mutual dimensions of the diametral clearance 6 between the valve member 2 and the valve guide bush 4, the external shoulder ring 7 and the internal shoulder rings 8 and 10 to each other, the non-return valve according to the invention can be adapted to the requirements of several systems.

I claim:

1. A non-return valve including a valve body having a fluid inlet, a fluid outlet, and an annular valve seat disposed in the body between the inlet and outlet; an enclosed hollow valve member, and a valve guide bush mounted in the valve body on one side of and coaxial with the valve seat, the valve guide bush having an elongated imperforate casing with an open end directed toward the valve seat and being closed at the other end, and the valve member having a portion disposed within said guide bush for axial displacement between a valve shut position in which the valve member makes sealing contact with the valve seat and a valve open position in which the valve member is axially spaced from the valve seat, wherein the improvement comprises:

means for forming a constricted space between the inner wall of the valve guide bush casing and the outer wall of the portion of the valve member disposed within the guide bush for a limited axial range adjacent to the valve shut position for damping the movement of the valve member as it approaches the shut position and means for limiting the entry of the valve member into the guide bush such that a chamber is disposed between the closed end of the valve guide bush casing and the valve member even when the valve member extends the greatest admissible distance into the guide bush, whereby the withdrawal of the valve member from the guide bush is not impeded by adhesion forces therebetween.

2. A non-return valve according to claim 1 further comprising means for forming an additional constricted space between the inner wall of the valve guide bush and the outer wall of the portion of the valve member disposed within the guide bush for a second limited axial range adjacent to the valve open position for damping the movement of the valve member as it approaches the full open position.

3. A non-return valve according to claim 1 wherein the means for forming the constricted space between the inner wall of the valve guide bush casing and the outer wall of said portion of the valve member comprises an internal shoulder ring extending radially inward from the inner wall of the valve guide bush casing and an external shoulder ring extending radially outward from the outer wall of the valve member, the relative axial locations of said internal and external rings on the respective guide bush casing and valve member being determined such that said external ring telescopes within said internal ring when the valve member moves through said limited axial range adjacent to the shut position.

4. A non-return valve according to claim 2 wherein the means for forming the constricted spaces between the inner wall of the guide bush casing and the outer wall of the portion of the valve member disposed within the guide bush comprise first and second axially spaced internal shoulder rings extending radially inward from the inner wall of the guide bush casing and an external shoulder ring extending radially outward from the outer wall of the valve member, the relative axial location of the first and second internal rings and the external ring being determined such that said external ring telescopes within the first internal ring when the valve member moves through said limited axial range adjacent to the valve shut position, and the external ring telescopes within the second internal ring when the valve member moves through said second limited axial range adjacent to the fully open position.

5. A non-return valve according to claim 3 or 4 wherein the valve guide bush is disposed in the valve body on the outlet side of the valve seat.

6. A non-return valve according to claim 5 wherein the means for limiting entry of the valve member into the valve guide bush comprises an internal flange extending radially inward from the inner wall of the guide bush, the internal diameter of said flange being smaller than the external diameter of said external ring of the valve member, and the axial position of said flange being determined such that said external ring abuts against the flange when the valve member is in the fully open position.

7. A non-return valve according to claim 5 wherein the portion of the valve member disposed within the valve guide bush when the valve is in the fully open position comprises a major part of the valve member.

* * * * *

UNITED STATES PATENT AND TRADEMARK OFFICE
CERTIFICATE OF CORRECTION

PATENT NO. : 4,231,395
DATED : November 4, 1980
INVENTOR(S) : Ronald Versluis

It is certified that error appears in the above—identified patent and that said Letters Patent is hereby corrected as shown below:

Col. 1, line 60, insert "that" after --valve--.

Col. 2, line 21, after "closed" delete "." and insert --positions, respectively--.

Signed and Sealed this

Thirtieth Day of June 1981

[SEAL]

Attest:

RENE D. TEGTMEYER

*Attesting Officer*  *Acting Commissioner of Patents and Trademarks*